United States Patent [19]

Simmons et al.

[11] Patent Number: 5,538,181

[45] Date of Patent: Jul. 23, 1996

[54] AUTOMATIC ROOM OCCUPANCY CONTROLLED FUEL SAVINGS SYSTEM FOR AIR CONDITIONING/HEATER UNITS

[76] Inventors: Michael L. Simmons, 7205 Signal Hill Rd., Manassas, Va. 22111; Robert J. Goldsborough, 7627 Matera St. #3, Falls Church, Va. 22043

[21] Appl. No.: 433,873

[22] Filed: May 2, 1995

[51] Int. Cl.[6] ............................. G05D 23/00; F23N 5/20
[52] U.S. Cl. ............................................. 236/51; 236/47
[58] Field of Search .................. 236/47, 51, 1 R; 165/11.1

[56] References Cited

U.S. PATENT DOCUMENTS

| | | | |
|---|---|---|---|
| Re. 33,146 | 1/1990 | Carroll et al. | 165/11.1 |
| 4,027,171 | 5/1977 | Browder et al. | |
| 4,101,886 | 7/1978 | Grimes et al. | 165/14 |
| 4,232,819 | 11/1980 | Bost | 236/47 |
| 4,391,406 | 7/1983 | Fried | 236/47 |
| 4,443,809 | 2/1984 | Shultz | 236/47 |
| 4,462,540 | 6/1984 | Dytch | 236/47 |
| 5,100,053 | 3/1992 | Manson et al. | 236/47 |
| 5,127,575 | 7/1992 | Beerbaum | 236/46 R |
| 5,318,224 | 6/1994 | Darby et al. | 236/51 |

*Primary Examiner*—William E. Wayner
*Attorney, Agent, or Firm*—Laurence R. Brown

[57] ABSTRACT

This invention relates to a simplified, substantially self contained fuel savings control system for in-room air conditioner/heater units, which automatically turns off the power when the room is unoccupied. The system is typically contained in a single housing unit that may be plugged in between an in-room power line outlet and a power cord to the heater-cooler unit. The system is universal in scope, being adaptable to different kinds of thermostatically controlled systems powered from a local power line. That is achieved, in part, by letting the temperature controls built into in-room thermostatically controlled units establish the temperature and controlling the power to the in-room units by sensing room occupancy and removing power when the room is unoccupied. This invention therefore represents an advance in the art, which affords a simplified low cost power control unit for automatically turning off power to the in-room heater-cooler unit when a room is unoccupied, and which constitutes a power control unit configured to minimize installation cost and rewiring of different kinds of in-room temperature control systems.

7 Claims, 2 Drawing Sheets

AUTOMATIC ROOM OCCUPANCY CONTROLLED FUEL SAVINGS SYSTEM FOR AIR CONDITIONING/HEATER UNITS

TECHNICAL FIELD

This invention relates to the method and apparatus for automatically controlling in-room heater-cooler systems, and more particularly it relates to fuel savings by turning off in-room electrically powered heater-cooler system power when the rooms are unoccupied.

BACKGROUND ART

The prior art has recognized the desirability of fuel savings by turning off electric air conditioner units or heater units when rooms become unoccupied. Power savings becomes an important criterion of profitable operation, particularly in the hotel/motel industry, where a guest may check out early in the morning leaving the air conditioner or heater unit fully operative, and this may not be remedied until the room is readied for a new occupant by a maid in the late afternoon.

In order to justify retrofit of an in-room system to one which automatically senses the occupancy and shuts off the power to the heater-cooler unit when there is no occupancy, the cost of the retrofit units and the installation costs are critical. In other words the costs of the conversion must pay for itself within a relatively short time period, preferably no longer than a year, in order to justify the outlay for the retrofit.

The prior art fuel saving systems are not well adapted for retrofit. For example, they have problems of interfitting with different kinds of basic installed systems with no standard configuration. This means customization of retrofit systems for different kinds of in-room units at a high equipment and wiring cost. Furthermore, if an installed system is retrofitted with an auxiliary control unit there is a problem of system communication between the basic system and the auxiliary control unit without interference with the system functioning, and the necessity for system design changes, with corresponding high electric connection costs.

The prior art conversion equipment cost for a retrofit installation thus is a significant problem that has not satisfactorily been resolved. For example, completely automatic temperature control is an expensive feature in prior art control units, requiring a thermal sensor and a corresponding temperature correction system to maintain a desired temperature level. Furthermore the initial conversion cost is significant, requiring expert electrician labor, in order to make a retrofit unit compatible with the wiring and functioning of the in-room unit in service.

Systems requiring a comprehensive computer control system are too expensive for use in retrofit of a single in-room temperature control system, for example. Furthermore such systems are not easily maintained or repaired when malfunctioning.

Functional performance is also critical in the prior art. Accordingly problems complex multiple sensor control systems or critical placement of sensors within the room for detecting occupancy can produce unacceptable functional performance.

Some systems of the prior art rely upon manual intervention, which because of human errors and lack of action cannot give satisfactory performance for optimizing fuel savings.

These problems in the prior art are exemplified in the typical U.S. patented art now discussed. E. A. Carrell, et al., U.S. Pat. No. Re. 33,146, Jan. 16, 1990 for Occupancy Responsive Temperature Control System, relies upon a door switch which requires the manual opening and closing of a door. J. C. Grimes, et al., U.S. Pat. No. 4,101,866, Jul. 18, 1978 for Apparatus for Conserving Energy in Electrical Appliances, also relies upon manual actuation to work a dead bolt switch in the door for reset of the system after an occupant returns. These systems are not fully automatic, nor reliable, since a door or a dead bolt may be left open by an occupant thus causing system malfunction.

It is critical in the motel/hotel industry to provide comfort to the guest occupants without involving complex adjustments, and many systems thus are unacceptable because the guests may not find their quarters at proper temperature when unreliable or complex systems malfunction. Furthermore, guests are not patient with systems that require critical operating adjustments.

R. H. Beerbaum, U.S. Pat. No. 5,127,575, Jul. 7, 1992 for Supervisory Control Unit for Electrical Equipment and D. R. Schulz, U.S. Pat. No. 4,433,809, Feb. 28, 1984 for Controller for Air Conditioning or Heating System require thermostatic controls that are critical in operation, costly and wasteful because of redundancy of ensuing controls. This can cause malfunctions and interference with built-in thermostatic control systems resulting in guest discomfort. A. Dytch, U.S. Pat. No. 4,462,540, Jul. 31, 1984 for Control System for an Air Temperature Changing Unit similarly requires a temperature sensing controls in addition to thermostatic controls available in the air conditioner unit, so that there is probable interference and overlap of the automatic temperature control system, and a necessity to coordinate the relative functions of more than one temperature control sensor. Extra apparatus is not only expensive but adds to the unreliability of the system and probably complexity in setting operating controls.

In addition, the Dytch system is typical of control units that may give false responses representative of occupancy and thus are not capable of responding accurately to the occupancy of rooms by guests that require temperature controls. Thus, the Dytch sound detection method of occupancy sensing is subject to many kinds of false signals, such as from knocks on the door and neighbor's sounds that pass through the walls, and other extraneous noises that may occur to thus disrupt the theoretical savings of power during room unoccupancy.

If a room is unoccupied for long periods of time under extreme temperature conditions, pipes may freeze or the rooms may be too warm for immediate occupancy by a guest. Thus, it is desirable in an automatic system that there be a compatible manner of conforming to long term requirements as well as short term requirements with enough flexibility to satisfy the needs of various hotel/motel proprietors during long periods of unoccupancy, for example.

Thus, it is a general objective of the invention to provide a simplified fuel savings control system, which is easily installed for retrofit use and inexpensive, and yet is fully automatic for control of heater/cooler system power consumption room by room based upon occupancy of the rooms.

DISCLOSURE OF THE INVENTION

This invention provides method and apparatus for savings of power consumed by thermostatically controlled in-room temperature control systems such as heaters and air conditioners. Room occupancy is reliably detected by a wide-angle motion sensor operable to detect movement within substantially the entire room occupancy area.

Errors and undesirable control signals are eliminated by room occupancy control signals derived from a wide angle motion sensor. Furthermore, the system automatically provides that if a room guest leaves to go to a car and returns, or goes to breakfast or lunch and returns for relatively short periods of time that the heater or air conditioner unit is not inactivated.

In general it is not desirable to cycle on and off the temperature control system unnecessarily, in part because of the inherent power surges expended by initial energization of motors, particularly in a cooler compressor. Thus, a timer, preferably a digital timer with time adjustability, provides a reasonable time period before an unoccupancy signal is indicated in the monitored room. Thus, assuming for example that the predetermined time delay for an unoccupancy signal after the last motion sensing indication is set for forty minutes, a time count signal is produced as an output signal indicating that the room is unoccupied. If the timer is reset before the forty minute period expires by renewed motion in the room there is no lapse in operation under control by the existing thermostat. This time delayed signal, represented by a full count set on a digital timer, for example, then becomes a power control signal that eliminates unnecessary short term on/off switching of power. The full timer count is representative of the condition that a hotel guest, for example, has checked out of the room so that the temperature control system can be taken off line until a new guest arrives.

The power control signal of this invention controls only the application of power to the in-room thermostatically controlled system by way of connection to the power line feeding the in-room temperature control system.

The invention thus provides a very simple, low cost, reliable control system that requires a minimum of parts and at most very simple electrical wiring for installing into an existing in-room thermostatically controlled temperature control system. This gives the important advantage, for the power savings accessory of this invention, that no thermostatic controls are necessary or desired in the added control unit for retrofitting an existing system that might interfere with or interact with the existing thermostat control system of various types that are already installed in different in-room systems installations.

Accordingly this invention provides a control system particularly adapted for retrofit of already installed systems or units in the hotel/motel industry as a power savings accessory. Because of the simplicity and nature of this invention, a preferred embodiment may be simply a plug in, self contained accessory that plugs into a power receptacle and receives a power line cord from the in-room unit. It is clear that this system would significantly reduce the costs of retrofitting the many rooms in a hotel or motel, for example, and would quickly pay for itself in terms of the saved power.

Even if electrical wiring by an electrician is required to access hidden power line connections for example, or to meet code requirements of a particular county, it is evident that the invention does not require an electrician to modify the existing thermostat servo system controls nor to install an expensive thermostatically controlled servo system in the added power savings accessory of this invention that bypasses the built in thermostat control system of the installed in-room systems.

Accordingly the fully automatic electrically powered occupancy power savings system of this invention is particularly adapted for retrofitting resident in-room thermostat controlled heating and cooling systems to provide increased power savings with improved reliability. This is unexpectedly realized with a simplified system featuring both reduced equipment and installation cost so that the true power savings after the conversion cost will be significant.

Other objectives, features and advantages of the invention will be found throughout the following description, claims and appended drawings.

BRIEF DESCRIPTION OF THE DRAWINGS

In the various drawing views, wherein like reference characters will refer to similar features to facilitate comparison.

THE PREFERRED EMBODIMENTS

Figure 1:
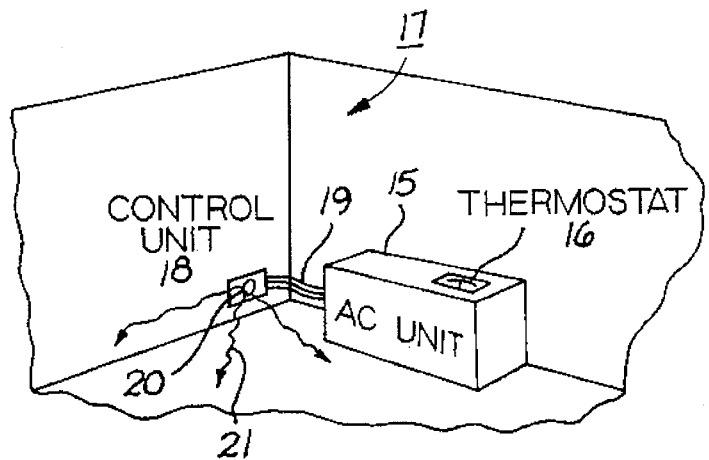
FIG. 1 is a sketch illustrating the simplified retrofit capabilities of a preferred embodiment of this invention.
Figure 2:
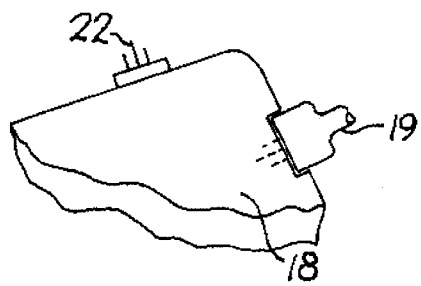
FIG. 2 is a fragmental enlarged view of a portion of the control unit of the FIG. 1 embodiment.

As may be seen from FIGS. 1 and 2, that the temperature of the room 17 is controlled by a thermostat 16 on the in-room air conditioner system unit 15 or a corresponding thermostatically controlled heating unit. This invention relates to an occupancy controlled fuel savings system accessory, which in this embodiment consists of the control unit 18 coupled by electrical power delivered to the A/C unit 15 by line 19 from an in-room power line source (not shown) available at a power receptacle into which the electrical plug 22 mates. The fuel savings control system thus is located in a plug-in accessory housing having a plug-in cord 19 for providing the operating power to the air conditioning unit 15. This compact and simply installed control unit accessory 18 contains a wide angle motion detector 18 which provides an IR pattern 21 outwardly into the substantially the entire room from a suitable location such as the corner of a room. This detector therefor provides a signal in response to motion of an occupant disturbing the IR pattern thereby to produce an automatic electrically powered occupancy controlled fuel savings system of the nature shown in the block diagram of FIG. 3. Such a motion detector with wide angle response will cover most of the usually occupied area of a hotel/motel room without critical location and thus may be mounted in a self contained unit. Alternatively a plug in motion sensor can be mounted at an optimized position near the control unit 18.

The system of this invention is simplified with low cost equipment and simplified installation into an existing thermostatically controlled system and is effective and substantially universally adaptable to many different types of thermostatically controlled systems for cooling and heating.

Also, this system has the advantage that it does not interfere with the thermostatic control systems provided in the already installed systems or require any changes in their operation, or manual intervention by a room occupant. Thus, a fully automatic accessory is provided particularly adapted to retrofit with various types of thermostatically controlled systems.

Figure 3:
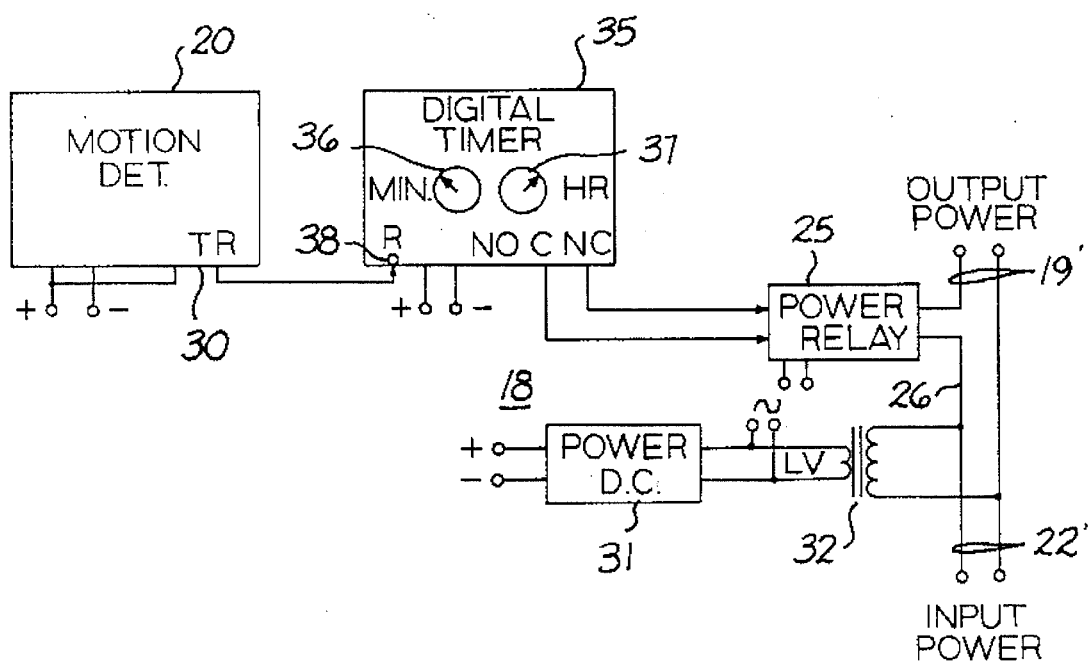
FIG. 3 is a simplified general block diagram system of the automatic occupancy-controlled electrical power savings system afforded by this invention.

As seen from FIG. 3, the control unit 18 requires no thermostatic control, and depends for operation simply upon the control of the power for the in-room system. This is effected by a power relay 25, which may be either of the magnetic coil or solid state type, of a current capacity to turn on or off the required current flow in the hot power lead 26 for operation of the temperature controlled system.

The motion detector 20 is preferably a wide angle passive IR motion detector of the type generally used in burglar alarm systems. The motion detector 20 preferably have magnetic relay embodiments provides a relay switch closure output 30 labeled TR for producing a trigger signal when motion is detected. The system is typically powered by a low voltage DC source 31 of 24 v. The low voltage power supply by way of step down transformer 32 may also supply 24 v AC for operation of magnetic relay coils employed in the system. Alternatively the system may replace contact closure magnetic relay control circuitry with equivalent solid state circuitry. Motion detectors of this type are currently commercially available from Scantronic (U.S.A.) Inc., 4772 Frontier Way, Stockton, Calif., 95295, for example.

The digital timer 35 typically is a solid state timer with presettable count times selectable from minutes and hours dials 36, 37. The timing is reset at the terminal 38 (R) in response to the detection of motion by motion detector 20, and when full count is reached, timer 35 operates a set of relay contacts having a center pole C with normally open (NO) and normally closed (NC) output contact leads. Thus the connection of the power relay for operation from the normally closed contact (NC) provides output power for operation of the thermostatically controlled in-room system at leads 19' until the digital timer reaches its full count for indicating the unoccupancy state.

Typically the timer may be set at forty minutes to permit desired normal periods of inactivity in the room before the power is removed from the in-room temperature controlled heater-cooler unit. This permits normal use of the room to go out to the hotel lobby, etc. without frequent triggering of power relay to remove power. Frequent triggering is undesirable because of greater wear upon the compressor unit for example in an air conditioner, and because of the very large current drain that is required when starting the compressor motor, which could seriously detract from other power savings otherwise afforded by this system. Typically in a hotel/motel room, for which this power savings accessory is particularly adapted, a guest otherwise may check out without disabling the air conditioner unit. That leaves the in-room unit running and consuming power unnecessarily for an empty room. No more than nominal heat or cooling by the in-room thermostatically temperature controlled system is required until a further guest checks in. It is thus to be recognized that considerable true savings are realized in lower power consumption, which power savings are enhanced because of the simplified nature of the accessory afforded by this invention and its very low installation cost, which avoids the normally required expensive services of a skilled electrician for retroactive installation of system modifications.

Figure 4:
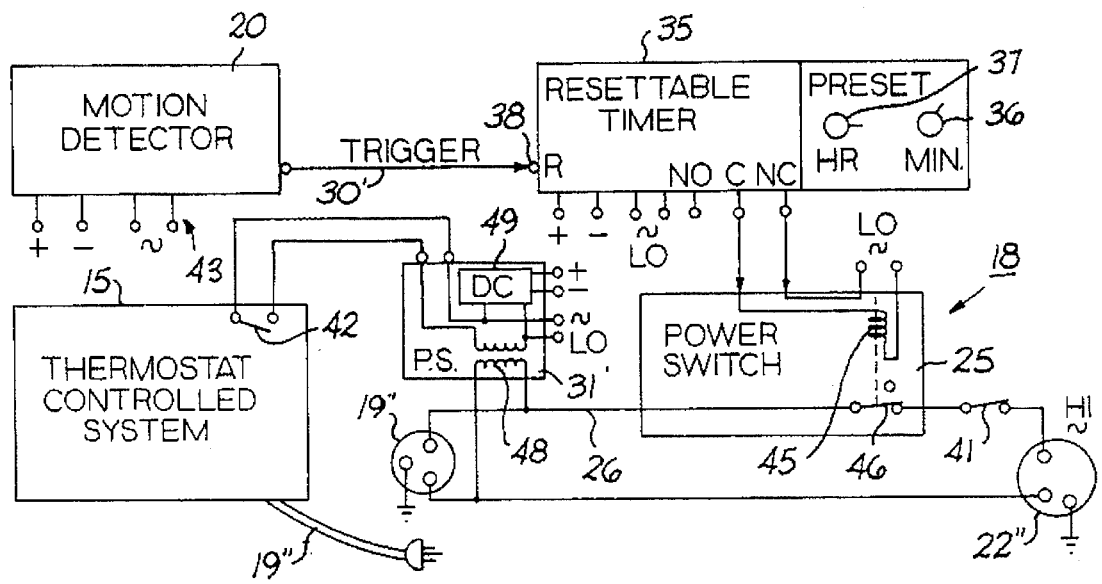
FIG. 4 is a block diagram system of a further simple automatic occupancy controlled power savings embodiment of the invention.

The FIG. 4 block diagram illustrates a typical power savings accessory produced with state of the art magnetic coil relay type switching circuits. These relay coils are typically operable with low voltage AC, such as 24 volts, available from the step down transformer in power supply 31'. They have switching contacts that are either normally open (NO) or normally closed (NC). For example the switch contact 46 in the power switch 25 is normally closed for supplying power while the counter is counting until the timer 35 reaches its preset count which closes its normally closed (NC) contact to make conductive contact with its center pole (C). Then the power switch relay coil 45 opens the power conveying contact 46 until such time as the timer 35 is reset by detection of motion by motion detector 20 upon reoccupancy of the room. Similar relays (not explicitly detailed) are operable in the motion detector 20 and timer 35 to provide switch closures for producing trigger signals, etc.

An accessory off/on switch 41 is provided in the hot line 26 passing between the power source socket 22" and the socket 19" for receiving either the plug of the thermostat controlled system power line 19" or an equivalent wired in connection in some types of systems that have no accessible cord and plug 19".

For coordination with off/on switching relays or thermostat induced connection in the thermostat control system 15, the closure contacts 42 are connected in line with the low voltage from the transformer 48 in the power supply 31'. In general the DC power supply 49 provides a few milliamperes of current for solid state circuits in the motion detector 20 and resettable timer 35, and thus this control feature is not a serious factor in savings of power cost. However this assures that the power line switch 46 is not opened when a thermostat switch 42 indicates for example that the system is turned off and yet connects the automatic power savings accessory into service when the thermostatically controlled system is operative.

The minimal nature of the interconnections, considering that contacts 42 are optional, is illustrated by the self contained system 18 is independently operable from the thermostatic controlled system 15 for the power savings accessory afforded by the system. This achieves simplified retrofit into an already installed thermostat controlled system 15 to control the power to that system without requiring a further temperature control which would only interfere or require extensive system alterations for system compatibility if supplied in a power saving accessory of the nature provided by this invention. Thus the apparatus cost is minimized, as is the installation cost.

Figure 5:
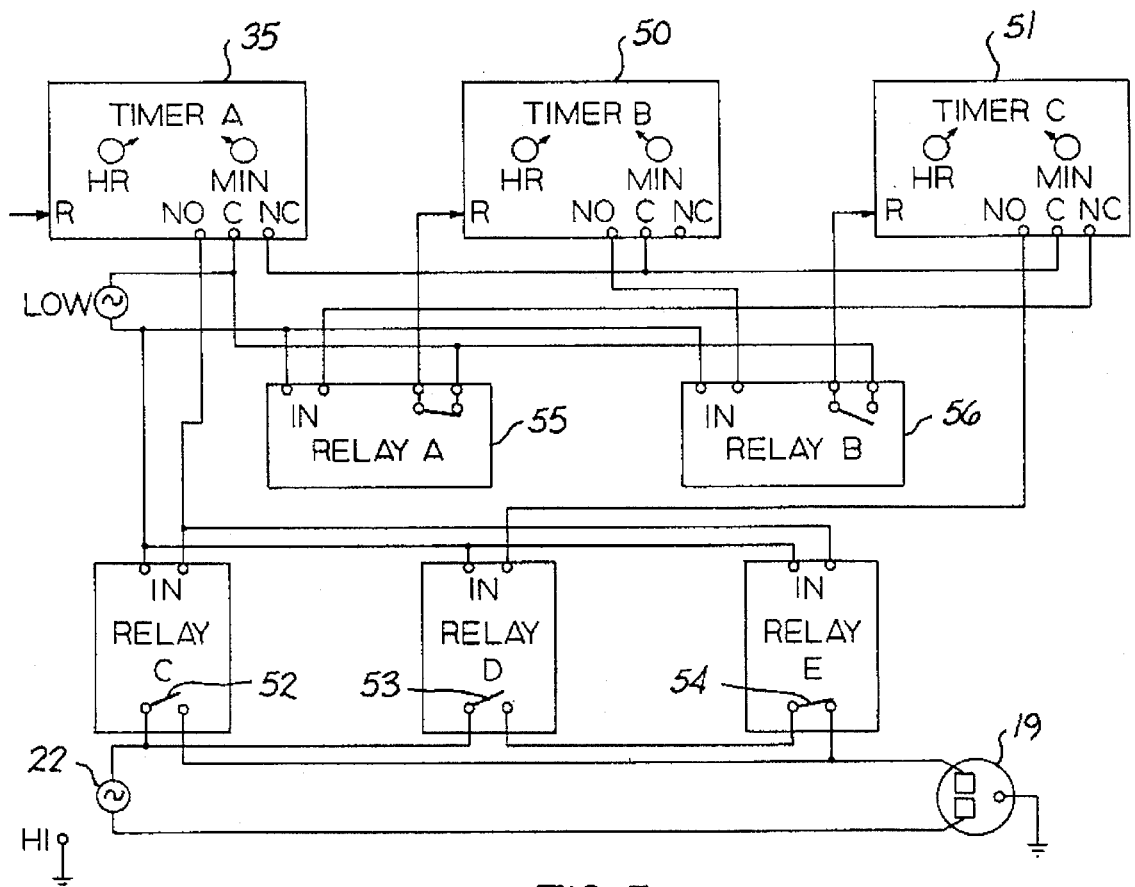
FIG. 5 is a block diagram system of an embodiment of the invention which additionally connects and disconnects the power with a predetermined on-off duty cycle during a period of time when the motion sensing control system indicates that the room is unoccupied.

In order to efficiently control room temperatures during extremely hot or cold atmospheric spells, the more complex control system of FIG. 5 may be desired. Thus, during longer unoccupancy periods the thermostatically controlled external system may be cycled on and off at a predetermined duty cycle rate that is compatible with power savings. That is, if a room gets too hot, the air conditioner system may not have the capacity to cool the room down in a reasonable time period. However, if the peak temperature is reduced to some predetermined degree by periodic cycling of the air conditioner while the room is unoccupied, then it can be cooled more quickly for the comfort of an arriving guest. The power savings efficiency afforded by this invention even may be increased if peak room temperatures are avoided and a duty cycle is programmed that permits guest comfort, since the overall power savings required to bring not so hot rooms quickly down to the guest ,comfort range may be greater than that required to cool down overheated rooms.

The FIG. 5 system thus is a preferred embodiment of the invention for achieving a preset duty cycle of on/off system time during periods of unoccupancy. Duty cycling of a temperature controlled system has been suggested for reducing the peak loads on the power source by J. B. Browder, et al., in U.S. Pat. No. 4,027,171, May 31, 1977 for Power Demand Limiting System to protect the power company peak loads. However that system would operate during guest occupancy and would in effect reduce the guest comfort. Furthermore in that system the reduction of peak power drain is readily defeated by a guest who sets the thermostatic controls for more comfort and thus can in effect produce a higher average power demand even when cycling the power on and off during the highest periods of demand. This invention provides a system operable for guest comfort which has the objective of reducing power costs to the hotel/motel host by controlling cooler-heater only under conditions of benefit to the guest for shut off when the guest rooms are unoccupied.

In FIG. 5, timers 50 and 51 are added to the basic system to provide for duty cycling during periods of long unoccupancy. The timers 35, 50 and 51 may be set for different predetermined time counts for changing the output contact positions so that the normally closed contact (NC) is actuated at the end of the count before the timer is reset.

Intermediate relays 55 and 56 control the reset (R) of timers 50 and 51 when their normally open contacts are respectively closed. Thus at full count of timer 51 relay 55 contacts will open and permit timer 50 to count. During timer 50 count the normally open contact (NO) will close and operate relay 56 to reset timer 51. Thus timer 50 could for example cycle for fifteen minutes and timer 51 for one hour thus resulting in alternating time count periods.

The outputs of timers 50 and 51 are energized through the C poles only when there is no occupancy, namely when unoccupancy timer 35 provides low voltage AC through common switching arm C to energize both common poles of timers 50 and 51.

Relay contacts 52, 53 and 54 respectively control power from the high voltage AC source at 22 to the thermostat controlled system power line 19. Relay contact 52 maintains a power connection whenever there is room occupancy by way of the NO contact during counting by timer 35, in the manner aforedescribed.

During unoccupancy however relay contacts 53 and 54 both must be closed to provide power to the in-room thermostatically controlled system via power line 19. This occurs when timer 51 reaches full count and closes NO and lasts until timer 50 by way of relay 56 resets timer 51, to supply the alternative off/on cycling for the respective time period counts. This results in a duty cycle of fifteen minutes on and one hour off during periods of unoccupancy. That achieves the desired control of duty cycling the in-room units during long periods of unoccupancy. Remember however, that the entire system (15, FIG. 4) is thermostatically controlled, so that there can be no cycling unless the room temperature is above the thermostat setting in the cooling mode of operation, for example.

Accordingly it is evident that the present invention has produced a simple effective power savings accessory, easily installed into an existing system for retrofit purposes. Also it is evident that the apparatus is simplified because there is no temperature control, but merely switching on and off of the power to the in-room system which is temperature controlled. Thus, those novel features of this invention, its nature and its spirit, are defined with particularity in the following claims.

We claim:

1. An automatic electrically powered thermostatless occupancy controlled power savings system for retrofit with a temperature controlled room system having an in-room thermostatic control unit for automatic control of room temperature, wherein said temperature controlled room systems are operated from a power line source within a room being temperature controlled, comprising in combination:

an electrically powered wide angle motion detector adapted to detect motion of an occupant within a substantial portion of a room in which one of said room systems is installed, time delay means responsive to said motion detector for producing a signal representative of lack of room occupancy for a predetermined time period, and switching means for controlling power from said power line source to said temperature controlled room system in response to the time delay means signal, said power savings system thereby constituting in combination a substantially self contained unit for retrofit installation by connection between said power line and said room system to supply power to the room system wherein said time delay means further comprises an auxiliary timing system for providing a standby mode of operation with the unit connected to the power line for controlling said switching means to produce a predetermined off-on duty cycle time for the temperature control room system during unoccupancy of the room.

2. The power savings system defined in claim 1 further comprising direct current power supply means for said motion detector operable from said power line source.

3. The power savings system defined in claim 1, wherein said switching means further comprises a relay with movable electrical contacts connected to open and close an electrical line conveying power to said temperature control room system.

4. The power savings system defined in claim 1, wherein said switching means is a solid state device for controlling power from said power line source to said temperature control room system.

5. The power savings system defined in claim 1 further comprising a feedback signal producing connection from the room system thermostat controls constituting an off-on control for the power savings system corresponding to an off-on switching condition status in the room system thermostat controls.

6. An automatic electrically powered thermostatless occupancy controlled power savings system for retrofit with a temperature controlled room system having an in-room thermostatic control unit for automatic control of room temperature, wherein said temperature controlled room systems are operated from a power line source within a room being temperature controlled, comprising in combination:

an electrically powered wide angle motion detector adapted to detect motion of an occupant within a substantial portion of a room in which one of said room systems is installed, time delay means responsive to said motion detector for producing a signal representative of lack of room occupancy for a predetermined time period, and switching means for controlling power from said power line source to said temperature controlled room system in response to the time delay means signal, said power savings system thereby constituting in combination a substantially self contained unit for retrofit installation by connection between said power line and said room system to supply power to the room system further comprising a single housing member substantially encompassing and supporting the power savings system adapted to be plugged into a power receptacle within a temperature controlled room, which housing member further has a self contained electrical outlet adapted for plugging in of a room system power cord for supplying power for operation of the room system.

7. The thermostatless method of automatically reducing power consumed by an electrically powered temperature control system with a thermostatically controlled system for producing a predetermined temperature and having an electrical power line feed for supplying operating power, comprising the steps of:

producing an occupancy control signal by sensing motion of an occupant in a room temperature controlled by said temperature control system, producing a power control signal from said occupancy control signal following a predetermined time delay of the sensed motion of an occupant in said room, disconnecting the electrical power line feed for said in-room temperature control system in response to the power control signal, thereby saving power for operation of the temperature control system during periods when the room is unoccupied, and alternately connecting and disconnecting the power line feed with a predetermined on-off duty cycle during a period of time when the motion sensing step indicates that the room is unoccupied.

* * * * *